United States Patent [19]

Burkley et al.

[11] Patent Number: 4,526,207

[45] Date of Patent: Jul. 2, 1985

[54] INFLATABLE PLUG FOR INTERIORLY CYLINDRICAL CONDUITS

[75] Inventors: Thomas E. Burkley, Akron; Harry T. Kifor, Canton, both of Ohio

[73] Assignee: The Goodyear Tire & Rubber Company, Akron, Ohio

[21] Appl. No.: 466,597

[22] Filed: Feb. 15, 1983

Related U.S. Application Data

[63] Continuation of Ser. No. 210,908, Nov. 28, 1980, abandoned.

[51] Int. Cl.³ ............................................. F16L 55/12
[52] U.S. Cl. ........................................ 138/93; 138/89
[58] Field of Search ............................... 138/89, 90, 93; 137/318, 317; 220/232, 233, 239

[56] References Cited

U.S. PATENT DOCUMENTS

| | | | |
|---|---|---|---|
| 2,324,520 | 7/1943 | Lamson | 138/93 X |
| 3,858,441 | 1/1975 | Comeau | 138/93 X |
| 3,870,085 | 3/1975 | Schneider | 138/93 |
| 4,144,908 | 3/1979 | Dunn | 138/93 |
| 4,291,727 | 9/1981 | Yie et al. | 138/93 |

FOREIGN PATENT DOCUMENTS

| | | | |
|---|---|---|---|
| 9991 | 7/1902 | Austria | 138/93 |
| 412676 | 7/1934 | United Kingdom | 138/93 |

*Primary Examiner*—James E. Bryant, III
*Attorney, Agent, or Firm*—R. D. Thompson

[57] ABSTRACT

A fluid inflatable plug for interiorly cylindrical conduits includes a rigid cylindrical mandrel having an elastomeric tubular sleeve about the outer curved surface of the mandrel. The sleeve includes reinforcements which extend in opposite sense helical paths throughout the longitudinal extent of the sleeve. The sleeve is folded back over one of its ends to form a loop region upon assembly to the mandrel. The ends of the sleeve are sealingly retained to the outer surface of the mandrel. A passage are provided for admitting and exhausting pressurized fluid between the sleeve and the outer curved surface of the mandrel. The plug may include a fluid passage therethrough independent of the passage for admitting an exhausting pressurized fluid between the sleeve and the surface of the mandrel.

2 Claims, 2 Drawing Figures

INFLATABLE PLUG FOR INTERIORLY CYLINDRICAL CONDUITS

This is a continuation, of application Ser. No. 210,908, filed Nov. 28, 1980, now abandoned.

BACKGROUND OF THE INVENTION

The abstract is not to be taken as limiting the invention of this application and in order to understand the full nature and extent of the technical disclosure of this application reference must be made to the accompanying drawings and the following detailed description.

The present invention relates to fluid inflatable and especially air inflatable devices and particularly to a plug which may be inserted in a tubular conduit.

Expandable plugs may be used to leak test a hose or pipe, to cap off the end of a hose or pipe, or to couple together the adjacent ends of two sections of hose or pipe.

SUMMARY OF THE INVENTION

In a principal aspect, this invention is a fluid inflatable plug for interiorly cylindrical conduits having a wide range of internal diameters. The plug comprises a mandrel, a sleeve, sleeve retaining means and fluid admitting and exhausting means. The mandrel is rigid, cylindrical and has an outer curved surface. The sleeve is a reinforced elastomeric tubular sleeve positioned about the outer curved surface, which is radially expandable to accomodate and sealingly engage the conduit interiors. The sleeve includes reinforcement plies which extend in opposite sense helical paths throughout the longitudinal extent of the sleeve. A loop region is formed in the sleeve, where the sleeve is folded back over one of its ends.

The sleeve retaining means retains and seals the ends of the sleeve to the outer curved surface of the mandrel. The retaining means is mounted on the mandrel and sleeve ends, and retains the one end over which the sleeve is folded such that the loop region is itself radially expandable.

The admitting and exhausting means is located on the mandrel. It is adapted for admitting and exhausting pressurized fluid between the sleeve and the outer curved surface of the mandrel, to radially expand the sleeve.

In the plug as described, the loop region, because of its own radial expandability, permits significant expansion of the sleeve. Thus, the plug is capable of accomodating and sealingly engaging many different conduits with a wide range of internal diameters.

The plug of the present invention may be better understood by reference to the following description and the drawings werein:

DETAILED DESCRIPTION OF THE PREFERRED EMBODIMENT

Figure 1:
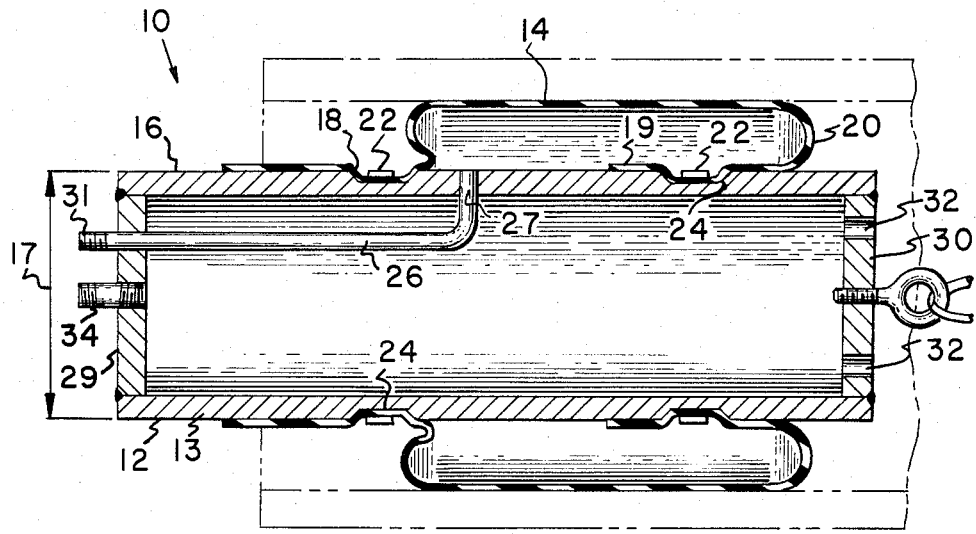
FIG. 1 is a longitudinal section of an inflatable plug incorporationg the invention.

Referring now to FIG. 1 there is shown a fluid inflatable plug 10. The plug includes a rigid cylindrical mandrel 12, which in a preferred embodiment is a hollow tube 13. Tube 13 may be formed from a section of steel pipe or other suitable material. A reinforced elastomeric sleeve 14, envelops a portion of the outer curved surface 16 of the mandrel 12. The ends 18, 19 of the sleeve 14 are sealingly retained to the mandrel 12 by clamp rings 22 which force the sleeve 14 into longitudinally spaced grooves 24 which are provided on outer curved surface 16 of mandrel 12. The sleeve 14 is folded back over its end 19 to form a loop region 20. Loop region 20 permits significant radial expansion of the sleeve so that a plug according to the present invention can accommodate and sealingly engage a relatively wide internal diameter range of conduits.

Mandrel 12 further includes means for admitting and exhausting pressurized fluid between the sleeve 14 and the outer curved surface 16 of the mandrel. In the particular embodiment shown there is provided a nipple 31 in first end wall 29 of mandrel 12. There is also provided port 27 through the wall of hollow tube 13. Tube 26 interconnects nipple 31 and port 27 thereby providing a fluid passage for remote inflation and deflation of elastomeric sleeve 14.

In the embodiment shown in FIG. 1, the hollow tube 13 includes walls 29 and 30 at its opposite ends. End walls 29 and 30 may include additional orifices such as 32 illustrated in the second end wall 30 or nipples such as 34 as illustrated in first end wall 29 which in conjunction with hollow tube 13 provide a fluid passage through the plug 10 which is independent of the means provided for admitting and exhausting pressurized fluid between the sleeve 14 and the outer curved surface 16 of the hollow tube 13.

Figure 2:
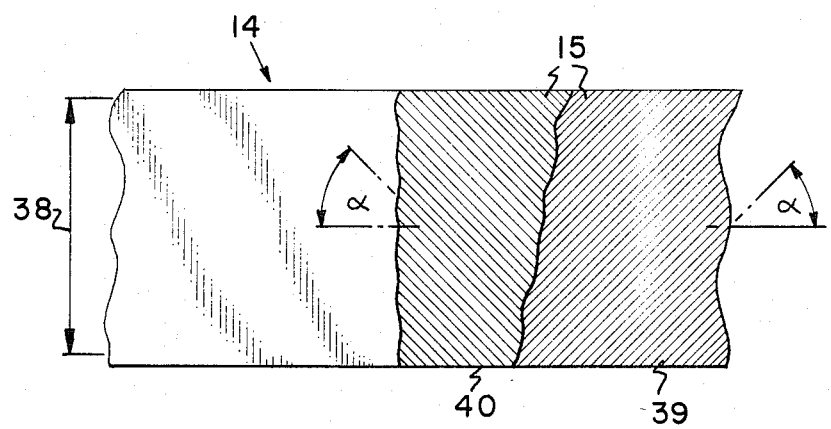
FIG. 2 is a fragmentary section of an elastomeric sleeve utilized in a plug according to the invention.

Referring now to FIG. 2, there is shown the cylindrical elastomeric sleeve 14 in its as-manufactured, undeformed state. Sleeve 14 has an inside diameter 38 which is less than the outside diameter 17 of mandrel 12. The sleeve 14 is preferably formed of two plies 39 and 40 of reinforcing cords 15. The cords of first ply 39 extend in a helical path throughout the longitudinal extent of the sleeve 14. The cords of the second ply 40 of reinforcing cords 15 extend in an opposite sense helical path throughout the longitudinal extent of the sleeve 14. The angle $\alpha$ at which the cords 15 of the ply 39 and 40 extend relative to the longitudinal direction of the sleeve may be varied according to the degree of radial expansibility desired for the plug. For a given fabric type and number of plies of that fabric greater burst strength and lower expansibility are obtained when the cords 15 reinforcing the sleeve 14 extend at a relatively high angle, for example, about 45 degrees relative to the lengthwise direction of the sleeve. Conversely lower burst strength but greater expansibility are obtained when the cords 15 of the elastomeric sleeve extend at a low angle, for example, about 15 degrees relative to the lengthwise direction of the sleeve.

While certain representative embodiments and details have been shown for the purpose of illustrating the invention it will be apparent to those skilled in the art that various changes and modifications may be made therein without departing from the spirit or scope of the invention.

We claim:

1. An inflatable plug for a conduit comprising, in combination:

a rigid, substantially cylindrical mandrel having an outer surface defining a mandrel diameter, an interior chamber, and a fluid passageway in communication with said interior chamber;

an elastomeric tubular sleeve, having a first end portion, positioned on said mandrel, said elastomeric tubular sleeve being inflatably expandable to sealingly engage said conduit, said elastomeric tubular sleeve including reinforcements therein extending in opposite sense helical paths, said elastomeric tubular sleeve having a relaxed diameter in an uninflated state less than said mandrel diameter, whereby said elastomeric tubular sleeve closely conforms to said rigid, substantially cylindrical mandrel in said uninflated state so as to facilitate insertion of said inflatable plug into said conduit;

clamp means for sealingly securing said elastromeric tubular sleeve to said rigid, substantially cylindrical mandrel in a predetermined manner at a first and second circumferential engagement, said fluid passageway interposing said first and second circumferential engagements, said first end portion of said elastomeric tubular sleeve being folded over and into said elastomeric tubular sleeve so as to extend to said first circumferential engagement and so as to form a loop region in said elastomeric tubular sleeve, said loop region extending away from said fluid passageway and substantially beyond said first circumferential engagement so as to substantially increase the longitudinal extent and expandability of said elastomeric tubular sleeve; and means for admitting and exhausting pressurized fluid between said elastomeric tubular sleeve and said rigid, substantially cylindrical mandrel through said fluid passageway.

2. An inflatable plug as claimed in claim 1 wherein said outward surface of said rigid, substantially cylindrical mandrel includes first and second circumferential grooves at said first and second circumferential engagements, respectively, said clamp means including a pair of ring clamps adapted to engage said first and second circumferential grooves.

* * * * *